US010914616B2

(12) United States Patent
Tsai et al.

(10) Patent No.: US 10,914,616 B2
(45) Date of Patent: Feb. 9, 2021

(54) ENCODER AND ROTATABLE DEVICE USING SAME

(71) Applicant: DELTA ELECTRONICS, INC., Taoyuan (TW)

(72) Inventors: Ching-Hsiung Tsai, Taoyuan (TW); Chi-Wen Chung, Taoyuan (TW); Ming-Tien Tsai, Taoyuan (TW); Chun-Hung Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 188 days.

(21) Appl. No.: 16/178,233

(22) Filed: Nov. 1, 2018

(65) Prior Publication Data

US 2020/0080870 A1 Mar. 12, 2020

(30) Foreign Application Priority Data

Sep. 12, 2018 (CN) .......................... 2018 1 1062399

(51) Int. Cl.
*G01B 7/30* (2006.01)
*G01D 11/02* (2006.01)
(Continued)

(52) U.S. Cl.
CPC .............. *G01D 11/02* (2013.01); *G01D 5/14* (2013.01); *G01D 5/264* (2013.01)

(58) Field of Classification Search
CPC ........ G01D 5/14; G01D 5/264; G01D 5/2451; G01D 5/2497; G01D 5/24423; G01D 5/3473; G01D 11/02; G01D 11/30; G01P 3/443; G01P 3/487; H02K 11/22; H02K 11/215; H02K 5/16; H02K 7/003

See application file for complete search history.

(56) References Cited

U.S. PATENT DOCUMENTS 7,692,422 B2 * 4/2010 Yamamoto ............ F16C 33/723
324/174
2011/0102895 A1 5/2011 Tsai et al.
(Continued)

FOREIGN PATENT DOCUMENTS

CN 105258715 A 1/2016
CN 106871942 A 6/2017
(Continued)

*Primary Examiner* — Minh N Tang
(74) *Attorney, Agent, or Firm* — Kirton McConkie; Evan R. Witt

(57) ABSTRACT

An encoder applied to a rotatable device including a code disc set, at least one bearing, a bearing housing, a main housing, a sensor and an elastic assembly. The code disc set is disposed on a rotation end of the rotatable device. The bearing is disposed around the rotation end, and the bearing housing is disposed around the bearing. The main housing is connected with a first end of the bearing housing. The sensor is disposed on the main housing and corresponds to the disc wheel set, and there is an interval between the sensor and the code disc set. The elastic assembly is connected with a second end of the bearing housing and a fixing end of the rotatable device. Therefore, the interval between the sensor and the code disc set is maintained to be fixed, and the good position detection performance and stable signals are obtained.

15 Claims, 8 Drawing Sheets

(51) Int. Cl.
  *G01D 5/26* (2006.01)
  *G01D 5/14* (2006.01)

(56) References Cited

U.S. PATENT DOCUMENTS

2016/0349079 A1    12/2016  Seo
2019/0248406 A1*   8/2019   Kaneko .................. H02K 5/15

FOREIGN PATENT DOCUMENTS

| | | |
|---|---|---|
| JP | S6074013 U | 5/1985 |
| JP | S62296740 A | 12/1987 |
| JP | H058428 U | 2/1993 |
| JP | H0669731 U | 9/1994 |
| JP | H08251875 A | 9/1996 |
| JP | 2003262539 A | 9/2003 |
| JP | 2013005654 A | 1/2013 |
| TW | I425195 B | 2/2014 |

\* cited by examiner

ENCODER AND ROTATABLE DEVICE USING SAME

FIELD OF THE INVENTION

The present invention relates to an encoder and a rotatable device using the same, and more particularly to an encoder and a rotatable device using the same configured to maintain the interval between the sensor and the code disc set.

BACKGROUND OF THE INVENTION

With the advancement of technology and the increasing demand for automation, in many products or equipment that use motors, such as computer numerical control machine tools (CNC machine tools) or robots, precise control of speed or position is required. In order to achieve precise speed and position control, accurate signal feedback is required. Therefore, the design of the encoders for detecting the rotational speed and position of the motors and sending the feedback signals are particularly important.

In prior arts, the design of the encoders includes the integrated architecture and the separated architecture. In the integrated encoders, the code disc and the corresponding sensor are integrated into a module, and the entire module can be directly disposed around to the rotating shaft of the motor. The relative position between the code disc and the sensor is easier to ensure, but the volume of the module is large. Furthermore, when the components in the encoders are damaged, the repair or replacement is complicated and difficult.

In the separated encoders, the code disc is directly disposed on the rotating shaft, and the sensor is combined with the rear end cover, so that the code disc and the sensor are separated structures. Although the volume of the separated encoders is smaller, the relative position between the code disc and the sensor is more likely to change due to external factors such as part processing size, assembly process or load variation when the rotating shaft is rotating, thereby affecting the position detection of the encoders.

Therefore, there is a need of providing an encoder and a rotatable device using the same to solve the drawbacks in prior arts, repair and replace the components thereof easily, maintain the interval between the sensor and the code disc set, reduce the vibration of the encoder, thereby obtaining good position detection performance and stable signals.

SUMMARY OF THE INVENTION

It is an object of the present invention to provide an encoder and a rotatable device using the same in order to solve the drawbacks of prior art.

The present invention provides an encoder and a rotatable device using the same. By disposing the bearing, the bearing housing and the elastic assembly, the interval between the sensor disposed on the main housing and the code disc set disposed on the rotation end can be maintained fixed without being affected by external factors, thereby obtaining good position detection performance and stable signals.

The present invention also provides an encoder and a rotatable device using the same. Through allowing the axial relative displacement of the bearing housing and the fixing end and limiting the coaxial rotation motion of the bearing housing and the fixing end by the elastic assembly, limiting the axial relative displacement of the bearing housing and the rotation end and allowing the coaxial rotation motion of the bearing housing and the rotation end by the bearing, and rigidly connecting the main housing and the bearing housing, the interval between the sensor and the code disc set is stably maintained. Moreover, when the sensor disposed on the main housing is faulty, the main housing can be easily removed for repair and replacement.

The present invention also provides an encoder and a rotatable device using the same. By disposing the elastic assembly including the spring and the damping element, the rotational freedom of the bearing housing can be limited without affecting the axial displacement thereof, and the vibration of the encoder can be reduced, thereby obtaining stable signals with good quality.

In accordance with an aspect of the present invention, there is provided an encoder. The encoder is applied to a rotatable device including a rotation end and a fixing end, and the rotation end is connected with the fixing end. The encoder includes a code disc set, at least one bearing, a bearing housing, a main housing, a sensor and an elastic assembly. The code disc set is disposed on the rotation end, and the at least one bearing is disposed around the rotation end. Each bearing has a bearing inner surface and a bearing outer surface, and the bearing inner surface is connected with the rotation end. The bearing housing is disposed around the bearing and connected with the bearing outer surface, and the bearing housing has a first end and a second end positioned on different sides. The main housing is connected with the first end of the bearing housing, the sensor is disposed on the main housing and corresponding to the code disc set, and an interval is between the sensor and the code disc set. The elastic assembly is connected with the second end of the bearing housing and the fixing end of the rotatable device.

In accordance with another aspect of the present invention, there is provided a rotatable device. The rotatable device includes a fixing end, a rotation part and an encoder. The rotation part has a rotation end, and the rotation end is connected with the fixing end. The encoder includes a code disc set, at least one bearing, a bearing housing, a main housing, a sensor and an elastic assembly. The code disc set is disposed on the rotation end, and the at least one bearing is disposed around the rotation end. Each bearing has a bearing inner surface and a bearing outer surface, and the bearing inner surface is connected with the rotation end. The bearing housing is disposed around the bearing and connected with the bearing outer surface, and the bearing housing has a first end and a second end positioned on different sides. The main housing is connected with the first end of the bearing housing, the sensor is disposed on the main housing and corresponding to the code disc set, and an interval is between the sensor and the code disc set. The elastic assembly is connected with the second end of the bearing housing and the fixing end.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
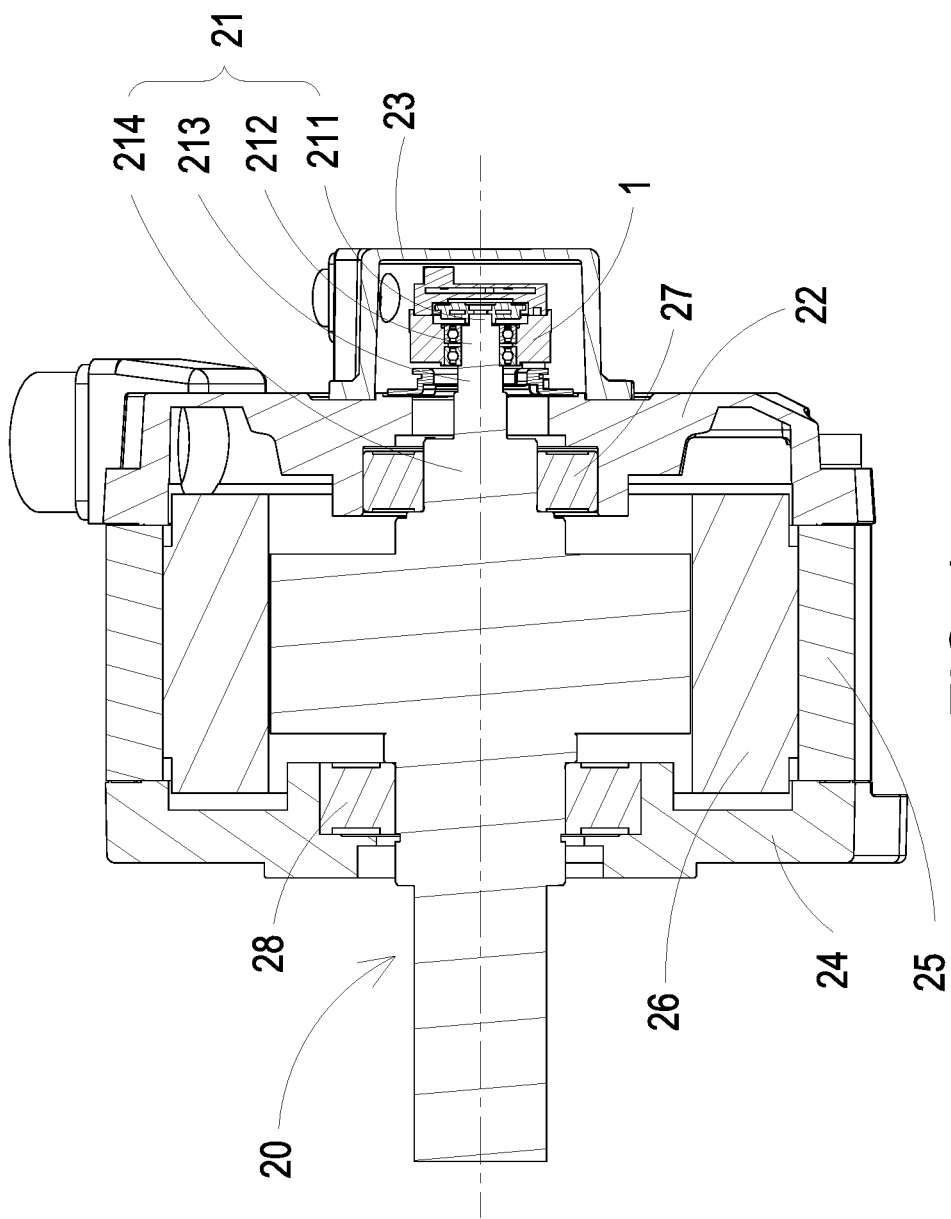
FIG. 1 schematically illustrates the sectional structure of an encoder and a rotatable device using the same according to an embodiment of the present invention.
Figure 2:
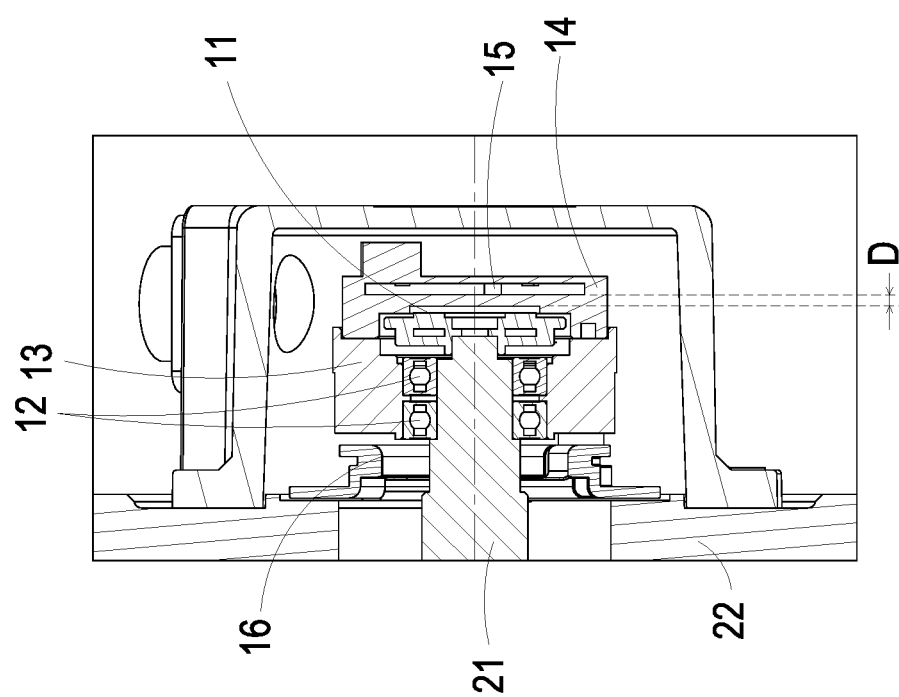
FIG. 2 schematically illustrates the detailed structure of the encoder and the rotatable device using the same as shown in FIG. 1.
Figure 3:
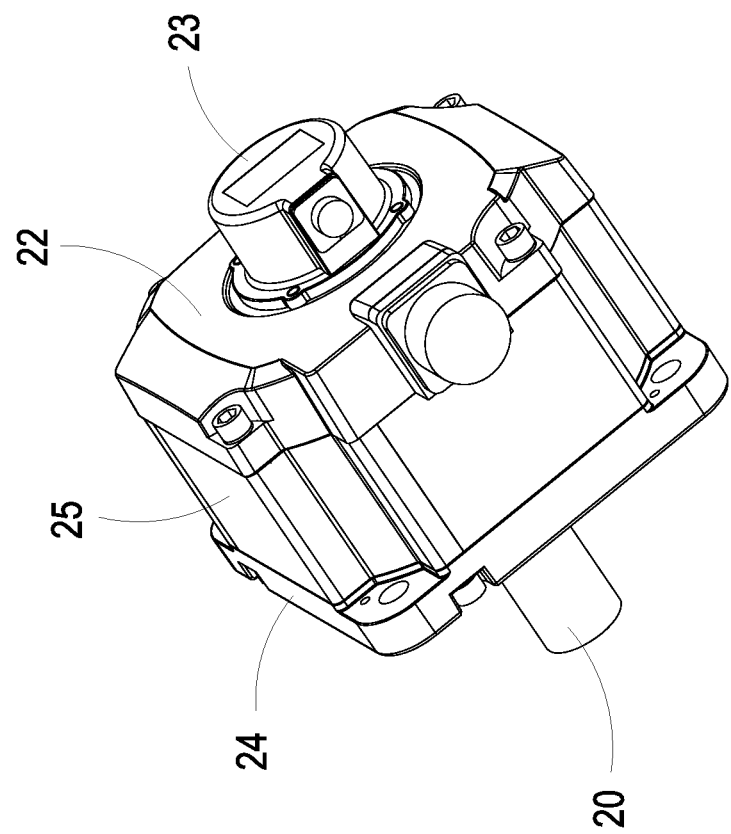
FIG. 3 schematically illustrates the structure of an encoder and a rotatable device using the same according to an embodiment of the present invention.
Figure 4:
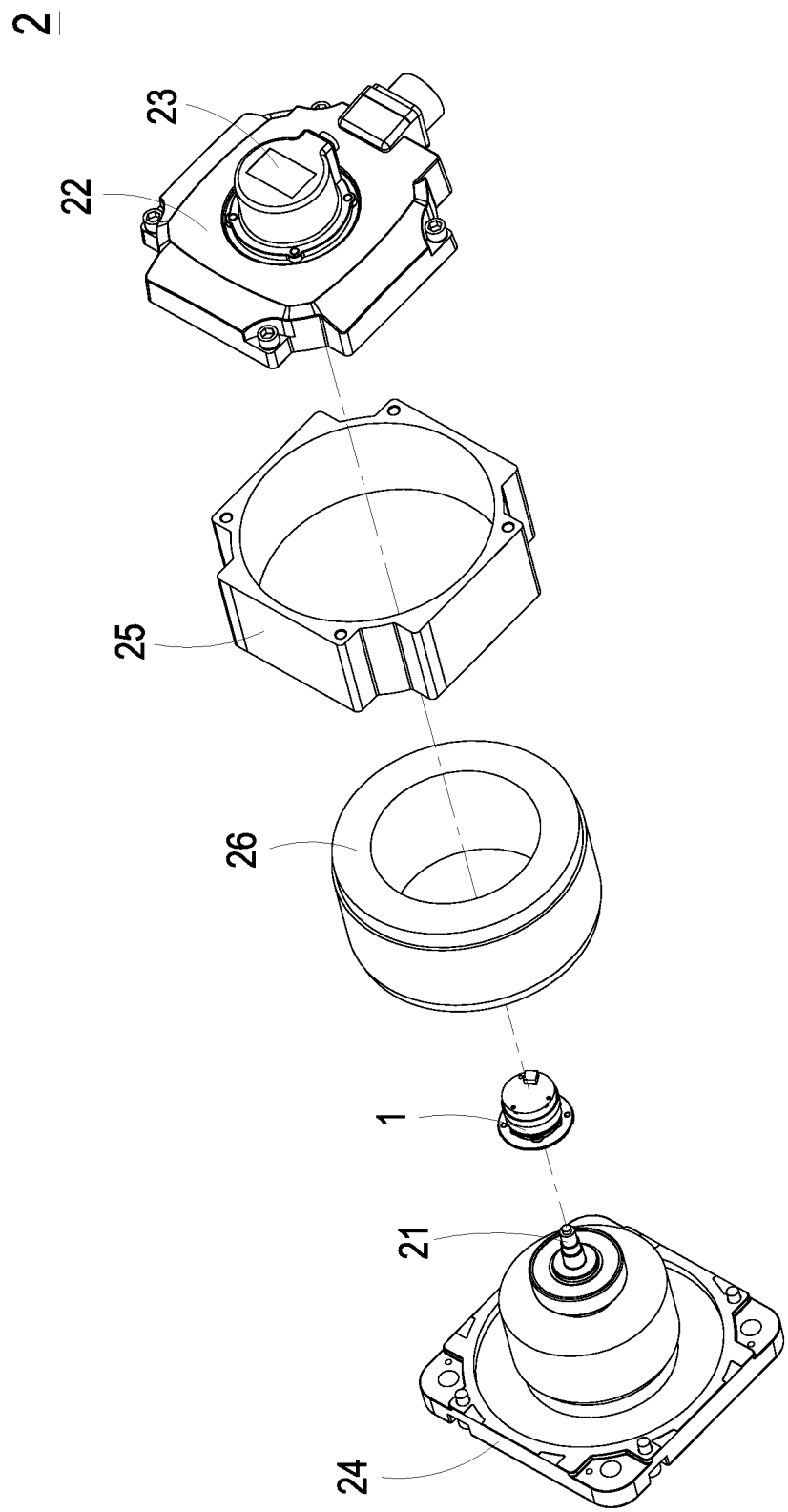
FIG. 4 schematically illustrates the exploded structure of an encoder and a rotatable device using the same according to an embodiment of the present invention.
Figure 5:
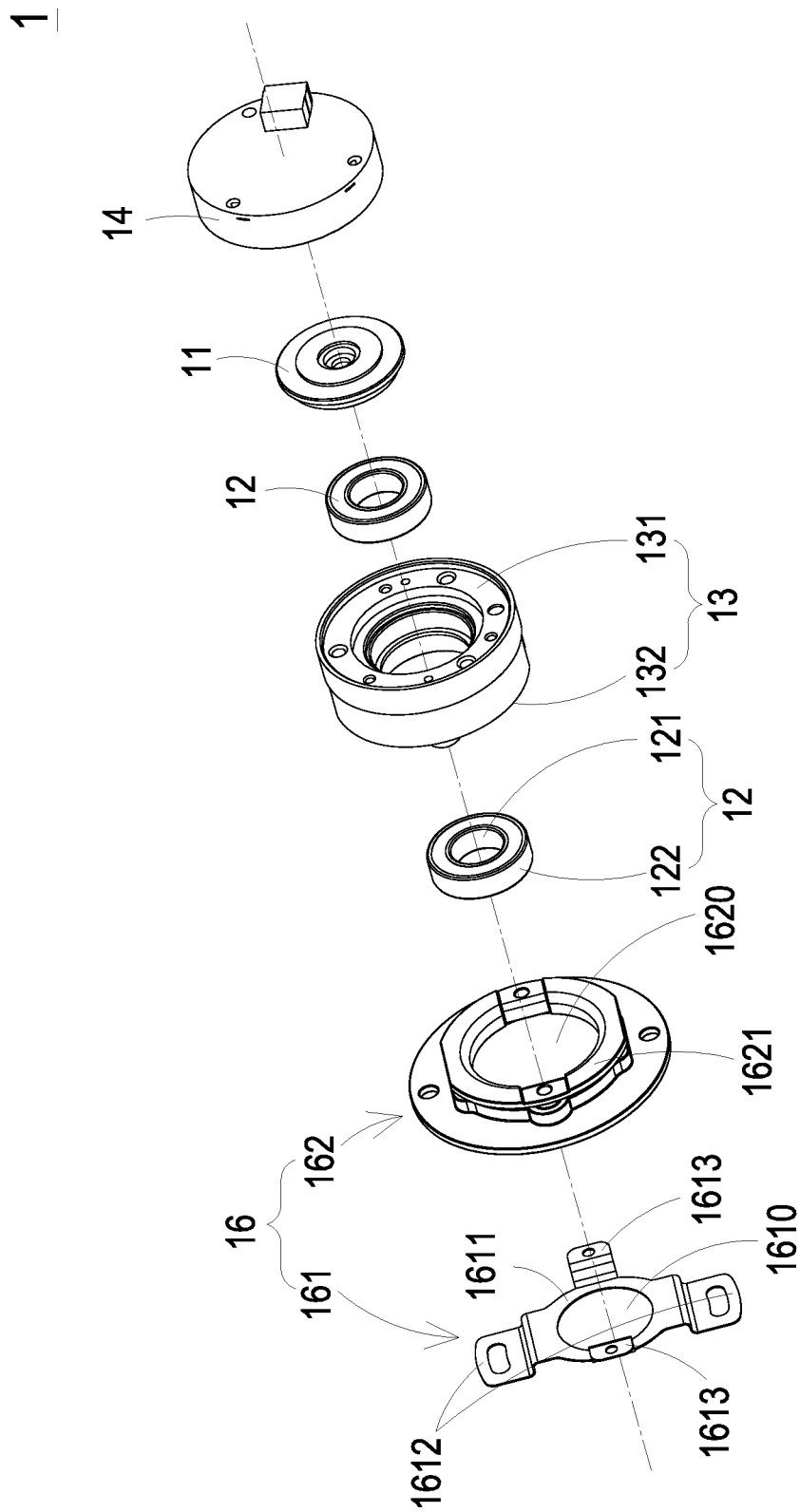
FIG. 5 schematically illustrates the exploded structure of an encoder according to an embodiment of the present invention.

Please refer to FIG. 1, FIG. 2, FIG. 3, FIG. 4 and FIG. 5. FIG. 1 schematically illustrates the sectional structure of an encoder and a rotatable device using the same according to an embodiment of the present invention. FIG. 2 schematically illustrates the detailed structure of the encoder and the rotatable device using the same as shown in FIG. 1. FIG. 3 schematically illustrates the structure of an encoder and a rotatable device using the same according to an embodiment of the present invention. FIG. 4 schematically illustrates the exploded structure of an encoder and a rotatable device using the same according to an embodiment of the present invention. FIG. 5 schematically illustrates the exploded structure of an encoder according to an embodiment of the present invention. As shown in FIG. 1, FIG. 2, FIG. 3, FIG. 4 and FIG. 5, the encoder 1 of the present invention is applied to a rotatable device 2. The rotatable device 2 includes a rotation end 21 and a fixing end 22, and the rotation end 21 is connected with the fixing end 22. For example, the rotation end 21 can be penetrated through the fixing end 22, and the rotatable device 2 can be a motor, but not limited herein. The encoder 1 includes a code disc set 11, at least one bearing 12, a bearing housing 13, a main housing 14, a sensor 15 and an elastic assembly 16. The code disc set 11 can be an optical code disc set or a magnetic code disc set, the bearing 12 can be a ball bearing, and the sensor 15 can be an optical sensor or a magnetic sensor, but not limited herein.

The code disc set 11 is disposed on the rotation end 21, and the bearing 12 is disposed around the rotation end 21. Each bearing 12 has a bearing inner surface 121 and a bearing outer surface 122, and the bearing inner surface 121 is connected with the rotation end 21. The bearing housing 13 is disposed around the bearing 12 and connected with the bearing outer surface 122 of the bearing 12, and the bearing housing 13 has a first end 131 and a second end 132 positioned on different sides. The main housing 14 is connected with the first end 131 of the bearing housing 13, and the code disc set 11 is disposed between the bearing housing 13 and the main housing 14. For example, the main housing 14 can be rigidly connected with the first end 131 through the screws, but not limited herein. The sensor 15 is disposed on the main housing 14 and corresponding to the code disc set 11, and there is an interval D between the sensor 15 and the code disc set 11. The sensor 15 can be disposed on a circuit board, but not limited herein, and the circuit board can be disposed on the main housing 14. The elastic assembly 16 is connected with the second end 132 of the bearing housing 13 and the fixing end 22 of the rotatable device 2.

The axial displacement of the bearing housing 13 relative to the fixing end 22 along the rotation end 21 is allowed by the elastic assembly 16, and the rotational motion of the bearing housing 13, which is coaxial with the fixing end 22, is limited by the elastic assembly 16. The axial displacement of the bearing housing 13 relative to the rotation end 21 along the rotation end 21 is limited by the bearing 12, and the rotational movement of the bearing housing 13, which is coaxial with the rotation end 21, is allowed by the bearing 12. Furthermore, the main housing 14 is rigidly connected with the first end 131 of the bearing housing 13. Consequently, the interval D between the sensor 15 and the code disc set 11 is maintained fixed.

That is to say, in the encoder and the rotatable device using the same of the present invention, by disposing the bearing, the bearing housing and the elastic assembly, the interval between the sensor disposed on the main housing and the code disc set disposed on the rotation end can be maintained fixed without being affected by external factors, thereby obtaining good position detection performance and stable signals. Furthermore, through allowing the axial relative displacement of the bearing housing and the fixing end and limiting the coaxial rotation motion of the bearing housing and the fixing end by the elastic assembly, limiting the axial relative displacement of the bearing housing and the rotation end and allowing the coaxial rotation motion of the bearing housing and the rotation end by the bearing, and rigidly connecting the main housing and the bearing housing, the interval between the sensor and the code disc set is stably maintained. Moreover, when the sensor disposed on the main housing is faulty, the main housing can be easily removed for repair and replacement.

In some embodiments, the rotation end 21 of the rotatable device 2 includes a first body 211, a second body 212 and a third body 213. The first body 211 is penetrated through the code disc set 11, the second body 212 is penetrated through the bearing 12, and the third body 213 is penetrated through the elastic assembly 16. The second body 212 is connected with the first body 211 and the third body 213. In some embodiments, the diameter of the first body 211 is less than the diameter of the second body 212, and the diameter of the second body 212 is less than the diameter of the third body 213, so as to facilitate the installation and assembly of the encoder 1, but not limited herein.

In some embodiments, in the encoder 1 of the present invention, the number of the bearing 12 is two. Each of the bearings 12 has the bearing inner surface 121 and the bearing outer surface 122, the bearing inner surface 121 is connected with the rotation end 21, and the bearing outer surface 122 is connected with the bearing housing 13. The two bearings 12 are connected in series and disposed on the bearing housing 13. The bearings 12 can be, for example but not limited to, angular contact ball bearings, and the curvature contact angles of the balls in the two bearings 12 are different to form different force modes when the rotation end 21 of the rotatable device 2 is rotated. In some embodiments, the sizes of the two bearings 12 are the same, and the bearings 12 are misaligned and preloaded by controlling the pressure and the stroke, so that the rotation accuracy is enhanced, but not limited herein.

In some embodiments, the encoder 1 further includes a bearing retaining ring. The bearing retaining ring is fastened through the screws to be disposed around the rotation end 21 of the rotatable device 2 and abutted against the bearing 12, and the bearing retaining ring and the rotation end 21 have threads matched to each other, thereby fixing the bearing 12. In some embodiments, the code disc set 11 is fastened to the bearing retaining ring and abutted against the bearing 12, that is, the bearing retaining ring is connected with the code disc set 11 and the bearing 12, thereby fixing the bearing 12 more stably, but not limited herein.

Please refer to FIG. 1, FIG. 2 and FIG. 5. As shown in FIG. 1, FIG. 2 and FIG. 5, the elastic assembly 16 of the present invention includes a spring 161. The spring 161 has a main body part 1611 and at least one bending part 1612, and the main body part 1611 has a hole 1610. The rotation end 21 of the rotatable device 2 is penetrated through the hole 1610. Each bending part 1612 is extended from the main body part 1611 and fixed to the fixing end 22 of the rotatable device 2, such that the axial rigidity of the bearing housing 13 can be reduced, and the rigidity in the rotation direction can be resisted. In some embodiments, the spring 161 has two bending parts 1612, and the bending parts 1612 are positioned on different sides of the main body part 1611, respectively, thereby fixing the two bending parts 1612 to the fixing end 22 of the rotatable device 2 by bilateral fixing method.

In some embodiments, the elastic assembly 16 further includes a damping element 162, and the spring 161 further includes two connection parts 1613. The connection parts 1613 are extended from the main body part 1611 and connected with the damping element 162. For example, the connection parts 1613 of the spring 161 are fixed to the damping element 162 by the screws, but not limited herein. In some embodiments, the damping element 162 has an opening 1620 and an extrusion part 1621, and the extrusion part 1621 is extended from the outer rim of the opening 1620. The connection parts 1613 of the spring 161 are fixed to the extrusion part 1621 of the damping element 162, the extrusion part 1621 is connected with the second end 132 of the bearing housing 13, and the rotation end 21 of the rotatable device 2 is penetrated through the hole 1610 of the spring 161 and the opening 1620 of the damping element 162. The spring 161 can be a metal spring for limiting the rotational freedom of the bearing housing 13 without affecting the axial displacement of the bearing housing 13 when the rotatable device 2 is operated, and the damping element 162 can be a rubber damping element for achieving the effect of vibration absorption while rotating at a high speed, but not limited herein.

Figure 6:
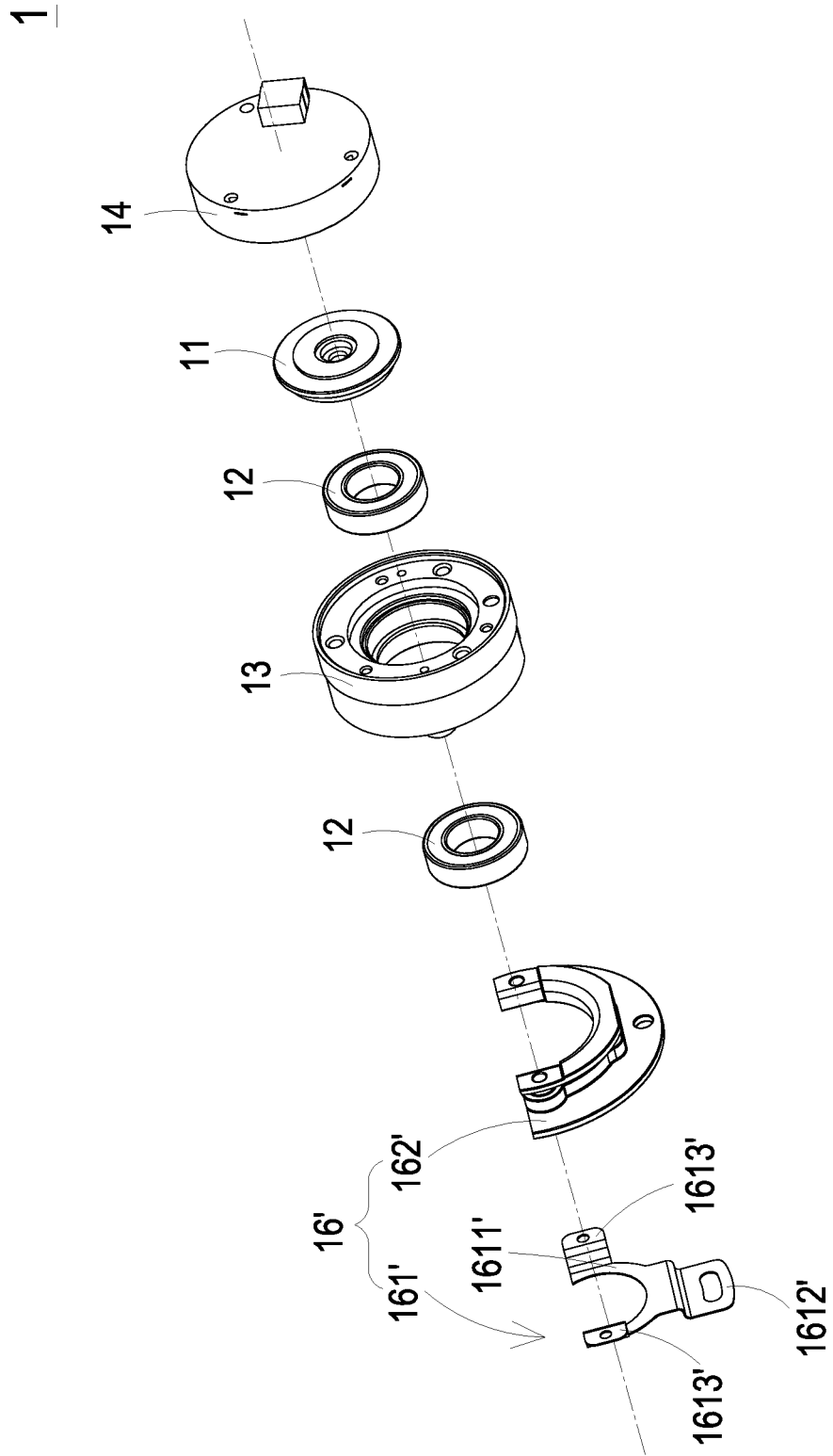
FIG. 6 schematically illustrates the exploded structure of an encoder according to another embodiment of the present invention.

Please refer to FIG. 6. FIG. 6 schematically illustrates the exploded structure of an encoder according to another embodiment of the present invention. As shown in FIG. 6, in some embodiments, the elastic assembly 16' is utilized in the encoder 1. The elastic assembly 16' includes a spring 161' and an arc-shaped damping element 162'. The spring 161' has a main body part 1611', single bending part 1612' and two connection parts 1613', and the bending part 1612' and the connection parts 1613' are extended from the main body part 1611'. The connection parts 1613' are connected with the arc-shaped damping element 162', and the single bending part 1612' is fixed to the fixing end of the rotatable device by unilateral fixing method, but not limited herein.

In other words, in the encoder and the rotatable device using the same of the present invention, by disposing the elastic assembly including the spring and the damping element, the rotational freedom of the bearing housing can be limited without affecting the axial displacement thereof, and the vibration of the encoder can be reduced, thereby obtaining stable signals with good quality.

Figure 7:
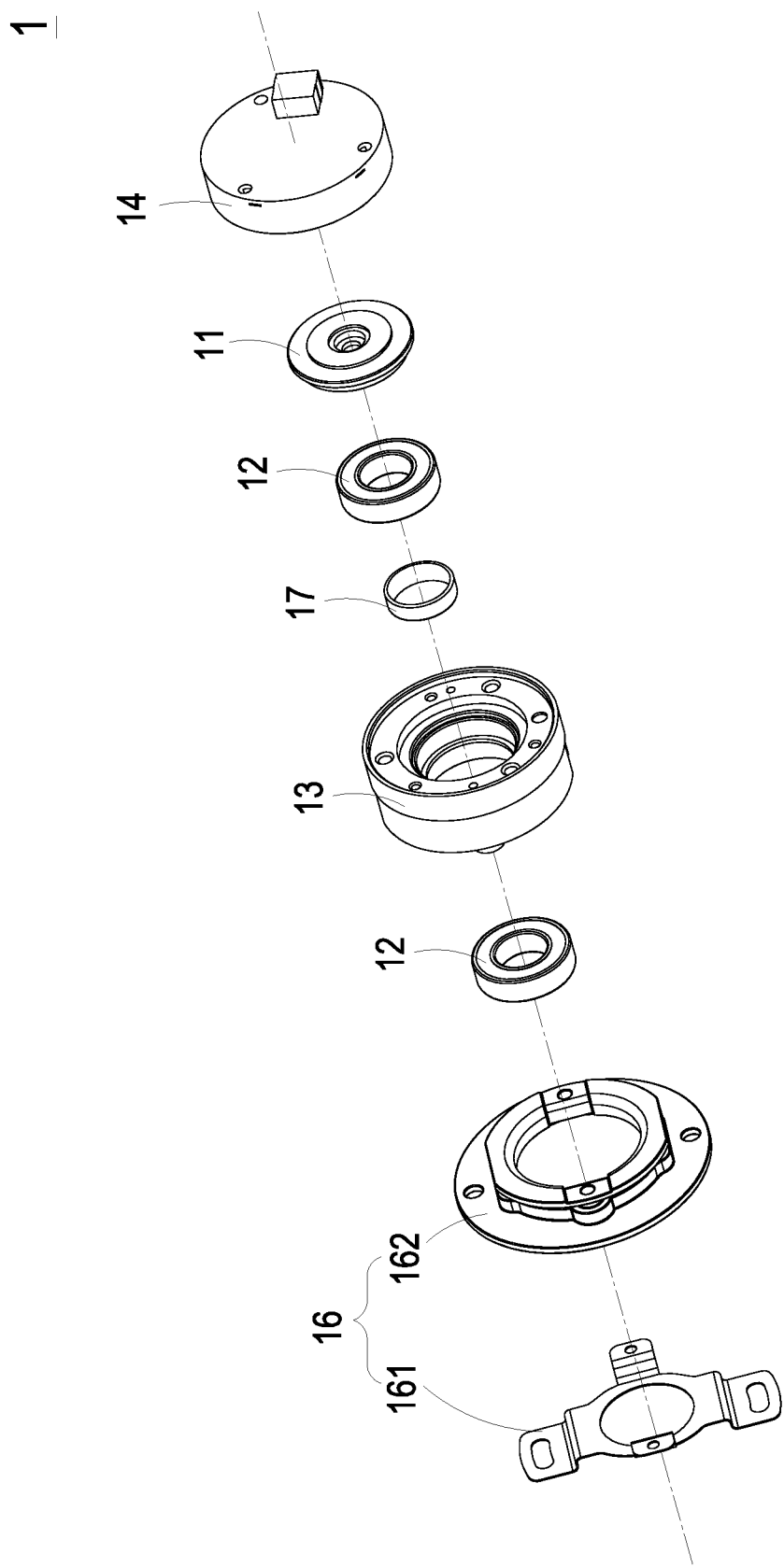
FIG. 7 schematically illustrates the exploded structure of an encoder according to another embodiment of the present invention.

Please refer to FIG. 7. FIG. 7 schematically illustrates the exploded structure of an encoder according to another embodiment of the present invention. As shown in FIG. 7, in some embodiments, the encoder 1 of the present invention further includes a spacer ring 17 disposed on the bearing housing 13. The spacer ring 17 is disposed between the two bearings 12, so that the bearings 12 are misaligned and preloaded, thereby enhancing the accuracy of rotation and avoiding noise generation, but not limited thereto.

Figure 8:
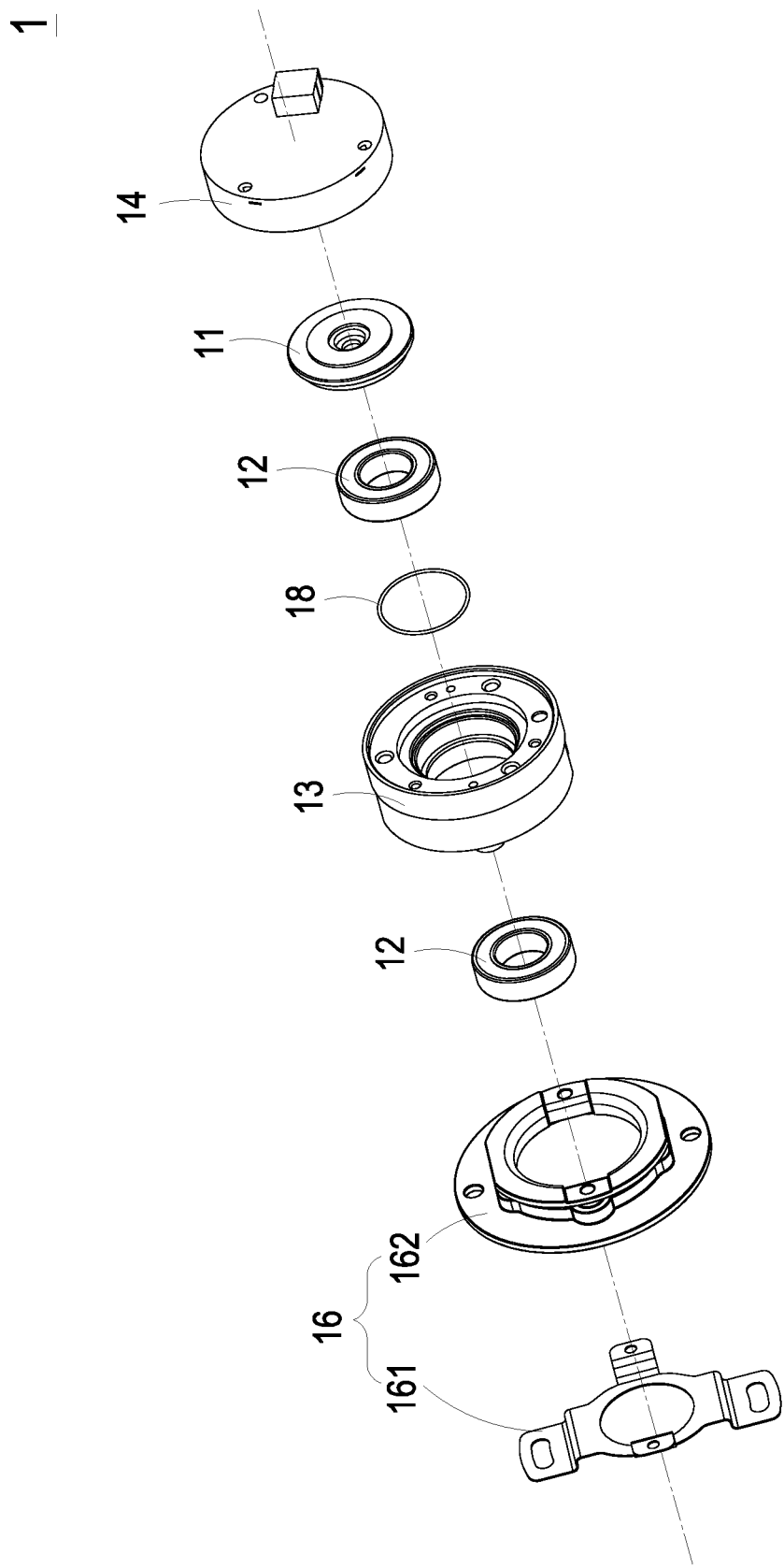
FIG. 8 schematically illustrates the exploded structure of an encoder according to another embodiment of the present invention.

Please refer to FIG. 8. FIG. 8 schematically illustrates the exploded structure of an encoder according to another embodiment of the present invention. As shown in FIG. 8, in some embodiments, the encoder 1 of the present invention further includes a wave spring 18 disposed on the bearing housing 13. The wave spring 18 is disposed between the two bearings 12, the size of one of the bearings 12 is small and the size of the other one of the bearings 12 is large, so that the bearings 12 are misaligned and preloaded, thereby enhancing the accuracy of rotation and avoiding noise generation, but not limited herein.

Please refer to FIG. 1, FIG. 2, FIG. 3, FIG. 4 and FIG. 5. As shown in FIG. 1, FIG. 2, FIG. 3, FIG. 4 and FIG. 5, the rotatable device 2 of the present invention includes a fixing end 22, a rotation part 20 and an encoder 1. The rotation part 20 has a rotation end 21, and the rotation end 21 is connected with the fixing end 22. For example, the rotation end 21 can be penetrated through the fixing end 22, but not limited herein. The encoder 1 includes the code disc set 11, at least one bearing 12, the bearing housing 13, the main housing 14, the sensor 15 and the elastic assembly 16. Since the detailed structure of the encoder 1 has been described in the embodiments mentioned above, it is not redundantly described herein.

In some embodiments, the rotatable device 2 further includes an encoder cover 23. The encoder cover 23 is connected with the fixing end 22, and the encoder 1 is accommodated in the encoder cover 23, thereby protecting the encoder 1. In some embodiments, the rotatable device 2 further includes a base 24, a casing 25 and a stator part 26. The rotation part 20 is penetrated through the base 24, and the casing 25 is connected with the fixing end 22 and the base 24. The stator part 26 is disposed on the casing 25 and disposed around the rotation part 20.

The rotatable device 2 of the present invention further includes a first carrier bearing 27 and a second carrier bearing 28. The first carrier bearing 27 is disposed on the fixing end 22 and disposed around the rotation end 21. The second carrier bearing 28 is disposed on the base 24 and disposed around the rotation part 20.

In some embodiments, the rotation end 21 of the rotation part 20 includes a first body 211, a second body 212, a third body 213 and a fourth body 214. The first body 211 is penetrated through the code disc set 11, the second body 212 is penetrated through the bearing 12, the third body 213 is penetrated through the elastic assembly 16, and the fourth body 214 is penetrated through the first carrier bearing 27. The second body 212 is connected with the first body 211 and the third body 213, and the third body 213 is connected with the fourth body 214. In some embodiments, the diameter of the first body 211 of the rotation end 21 is less than the diameter of the second body 212, the diameter of the second body 212 is less than the diameter of the third body 213, and the diameter of the third body 213 is less than the diameter of the fourth body 214, so as to facilitate the installation and assembly of the encoder 1 and the rotation end 21, but not limited herein.

From the above description, the present invention provides an encoder and a rotatable device using the same in order to solve the drawbacks of prior arts. By disposing the bearing, the bearing housing and the elastic assembly, the interval between the sensor disposed on the main housing and the code disc set disposed on the rotation end can be maintained fixed without being affected by external factors, thereby obtaining good position detection performance and stable signals. Furthermore, through allowing the axial relative displacement of the bearing housing and the fixing end and limiting the coaxial rotation motion of the bearing housing and the fixing end by the elastic assembly, limiting the axial relative displacement of the bearing housing and the rotation end and allowing the coaxial rotation motion of the bearing housing and the rotation end by the bearing, and rigidly connecting the main housing and the bearing housing, the interval between the sensor and the code disc set is stably maintained. Moreover, when the sensor disposed on the main housing is faulty, the main housing can be easily removed for repair and replacement. Meanwhile, by disposing the elastic assembly including the spring and the damping element, the rotational freedom of the bearing housing can be limited without affecting the axial displacement thereof, and the vibration of the encoder can be reduced, thereby obtaining stable signals with good quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An encoder applied to a rotatable device, wherein the rotatable device comprises a rotation end and a fixing end, and the rotation end is connected with the fixing end, and wherein the encoder comprises:
    a code disc set disposed on the rotation end;
    at least one bearing disposed around the rotation end, wherein each of the at least one bearing has a bearing inner surface and a bearing outer surface, and the bearing inner surface is connected with the rotation end;
    a bearing housing disposed around the bearing and connected with the bearing outer surface, wherein the bearing housing has a first end and a second end positioned on different sides;
    a main housing connected with the first end of the bearing housing;
    a sensor disposed on the main housing and corresponding to the code disc set, wherein an interval is between the sensor and the code disc set; and
    an elastic assembly connected with the second end of the bearing housing and the fixing end of the rotatable device,
    wherein axial displacement of the bearing housing relative to the fixing end along the rotation end is allowed by the elastic assembly, rotational motion of the bearing housing, which is coaxial with the fixing end, is limited by the elastic assembly, axial displacement of the bearing housing relative to the rotation end along the rotation end is limited by the bearing, rotational movement of the baring housing, which is coaxial with the rotation end, is allowed by the bearing, and wherein the main housing is rigidly connected with the first end of the bearing housing, such that the interval is maintained fixed.

2. The encoder according to claim 1, wherein the elastic assembly comprises a spring having a main body part and at least one bending part, wherein the main body part has a hole, and the rotation end penetrated through the hole, and wherein the at least one bending part extended from the main body part and fixed to the fixing end.

3. The encoder according to claim 2, wherein the spring has two bending parts, and the bending parts are positioned on different sides of the main body part, respectively.

4. The encoder according to claim 2, wherein the elastic assembly further comprises a damping element, and the spring further comprises two connection parts, wherein the connection parts are extended from the main body part and connected with the damping element.

5. The encoder according to claim 4, wherein the damping element has an opening and an extrusion part, and the extrusion part is extended from an outer rim of the opening, wherein the connection parts of the spring are fixed to the extrusion part of the damping element, the extrusion part is connected with the second end of the bearing housing, and the rotation end is penetrated through the hole and the opening.

6. The encoder according to claim 4, wherein the spring is a metal spring, and the damping element is a rubber damping element.

7. The encoder according to claim 1, wherein the rotation end comprises a first body, a second body and a third body, wherein the first body is penetrated through the code disc set, the second body is penetrated through the bearing, and the third body is penetrated through the elastic assembly, wherein the second body is connected with the first body and the third body.

8. The encoder according to claim 7, wherein the diameter of the first body is less than the diameter of the second body, and the diameter of the second body is less than the diameter of the third body.

9. The encoder according to claim 1, wherein the number of the at least one bearing is two, wherein the two bearings are connected in series and disposed on the bearing housing.

10. A rotatable device, comprising:
    a fixing end;
    a rotation part having a rotation end, wherein the rotation end is connected with the fixing end; and
    an encoder, comprising:
        a code disc set disposed on the rotation end;
        at least one bearing disposed around the rotation end, wherein each of the at least one bearing has a bearing inner surface and a bearing outer surface, and the bearing inner surface is connected with the rotation end;
        a bearing housing disposed around the bearing and connected with the bearing outer surface, wherein the bearing housing has a first end and a second end positioned on different sides;
        a main housing connected with the first end of the bearing housing;
        a sensor disposed on the main housing and corresponding to the code disc set, wherein an interval is between the sensor and the code disc set; and an elastic assembly connected with the second end of the bearing housing and the fixing end, wherein axial displacement of the bearing housing relative to the fixing end along the rotation end is allowed by the elastic assembly, rotational motion of the bearing housing, which is coaxial with the fixing end, is limited by the elastic assembly, axial displacement of the bearing housing relative to the rotation end along the rotation end is limited by the bearing rotational movement of the bearing housing, which is coaxial with the rotation end, is allowed by the bearing, and wherein the main housing is rigidly connected with the first end of the bearing housing, such that the interval is maintained fixed.

11. The rotatable device according to claim 10 further comprising an encoder cover, wherein the encoder cover is connected with the fixing end, and the encoder is accommodated in the encoder cover.

12. The rotatable device according to claim 10 further comprising:
   a base, wherein the rotation part is penetrated through the base;
   a casing connected with the fixing end and the base; and
   a stator part disposed on the casing and disposed around the rotation part.

13. The rotatable device according to claim 12 further comprising a first carrier bearing and a second carrier bearing, wherein the first carrier bearing is disposed on the fixing end and disposed around the rotation end, and the second carrier bearing is disposed on the base and disposed around the rotation part.

14. The rotatable device according to claim 13, wherein the rotation end comprises a first body, a second body, a third body and a fourth body, wherein the first body is penetrated through the code disc set, the second body is penetrated through the bearing, the third body is penetrated through the elastic assembly, and the fourth body is penetrated through the first carrier bearing, wherein the second body is connected with the first body and the third body, and the third body is connected with the fourth body.

15. The rotatable device according to claim 14, wherein the diameter of the first body is less than the diameter of the second body, the diameter of the second body is less than the diameter of the third body, and the diameter of the third body is less than the diameter of the fourth body.

\* \* \* \* \*